United States Patent [19]

Takahashi et al.

[11] Patent Number: 4,860,127
[45] Date of Patent: Aug. 22, 1989

[54] MAGNETIC DISK CARTRIDGE WITH ERASURE-PREVENTING DEVICE

[75] Inventors: Kenji Takahashi; Tsuneo Nemoto, both of Miyagi, Japan

[73] Assignee: Sony Corporation, Tokyo, Japan

[21] Appl. No.: 808,075

[22] Filed: Dec. 12, 1985

[30] Foreign Application Priority Data

Dec. 17, 1984 [JP] Japan .................. 59-191230[U]

[51] Int. Cl.⁴ .................. G11B 15/04; G11B 23/02
[52] U.S. Cl. .................. 360/60; 360/133
[58] Field of Search .................. 360/60, 132, 133

[56] References Cited

U.S. PATENT DOCUMENTS

| | | | |
|---|---|---|---|
| 3,828,363 | 8/1974 | Somers | 360/60 |
| 3,950,786 | 4/1976 | Shapley | 360/60 |
| 4,012,011 | 3/1977 | Saito | 360/60 |
| 4,041,537 | 8/1977 | Kishi | 360/60 |
| 4,380,030 | 4/1983 | Shiba | 360/60 |
| 4,460,930 | 7/1984 | Takahashi | 360/60 |
| 4,466,032 | 8/1984 | Saito | 360/99 |
| 4,496,999 | 1/1985 | Espin | 360/60 |
| 4,511,944 | 4/1985 | Saito | 360/133 |
| 4,536,812 | 8/1985 | Oishi et al. | 360/60 |
| 4,581,670 | 4/1986 | Nemoto et al. | 360/133 |
| 4,607,299 | 8/1986 | Oishi et al. | 360/60 |
| 4,618,060 | 10/1986 | Tarter | 360/60 |
| 4,660,105 | 4/1987 | Harris et al. | 360/60 |

FOREIGN PATENT DOCUMENTS

| | | | |
|---|---|---|---|
| 0045186 | 2/1982 | European Pat. Off. | 360/60 |
| G11B1704 | 12/1982 | Fed. Rep. of Germany . | |
| 59-168876 | 12/1984 | Japan . | |
| 2067000 | 7/1981 | United Kingdom . | |

Primary Examiner—Alan Faber
Assistant Examiner—Surinder Sachar
Attorney, Agent, or Firm—Ronald P. Kananen

[57] ABSTRACT

An indicator for representing a selectable recording state of a magnetic disk cassette, for example, a write-protection state, wherein a sliding piece fitted over a thin flat part contiguous with an opening in a lower cassette half is selectively visible through a window through an upper cassette half.

45 Claims, 5 Drawing Sheets

MAGNETIC DISK CARTRIDGE WITH ERASURE-PREVENTING DEVICE

BACKGROUND OF THE INVENTION

The present invention relates generally to a magnetic disk cartridge for storing image data, audio data, text data and the like. More specifically, the invention relates to an erroneous erasure-preventing device in a magnetic disk cartridge, which prevents a writing of additional data on the disk in order to protect data previously recorded on the disk.

Various kinds of magnetic disk cartridges are used to record image data, audio data, text data and other signals. One type of magnetic tape cartridge is disclosed in U.S. Pat. No. 4,466,032, issued on Aug. 14, 1984, to Saito, which is assigned to the same assignee as the present invention. This prior art disk cartridge encloses a flexible magnetic disk within a thin box-shaped cartridge. The cartridge defines an opening through which a magnetic head of a disk drive of a recording and reproducing apparatus has access to the disk surface for recording video, audio, text, digital data, and other signals and reproducing the recorded data.

As will be appreciated, when the recorded data are important and must not be inadvertently or erroneously erased, no additional data should be written or recorded onto the disk. One typical method of erasure-prevention in the known art involves a recess or opening at an appropriate point on the cartridge. The recess or opening in the cartridge receives a "write-preventing" lever or pin which prevents a write-head in the recording apparatus from contacting the disk while the lever or pin is within the recess or opening. In early disk cartridges, the recess or opening was sealed by a strip forming part of the cartridge, which strip was broken and removed after important data were recorded. Once the recess or opening covering strip was removed from the cartridge, the strip could not be re-installed on the cartridge to enable that cartridge to receive additional recorded data. Therefore, conventional magnetic disk cartridges have their recesses or openings sealed by adhesive tape or other appropriate means.

In order to make such disk cartridges more convenient to use, a novel magnetic disk cartridge was proposed in U.S. Pat. No. 4,460,930, issued on July 17, 1984 to Takahashi, and assigned to the assignee of the present invention. In the proposed arrangement, the magnetic disk cartridge is provided with an "erasure-preventing" movable piece which can slide between a closing position at which the aforementioned recess or opening is covered and an opening position at which the recess or opening is uncovered to allow entry of a "write-preventing" lever or pin as set forth above. This movable piece in the proposed arrangement is not removed from the cartridge, and therefore allows a repeated change of state of the magnetic disk cartridge between a "write-enabled" state and a "write-inhibited"0 state. In this cartridge, further writing on the disk is enabled when the movable piece is in its recess-closing position. On the other hand, further writing is inhibited when the movable piece is in its recess-opening position.

Although the aforementioned cartridge advantageously allows a repeated change of writing-receiving state of the magnetic cartridge without requiring other means for covering the recess or opening after once being actuated to the write-inhibited state, the presence of the movable piece causes the structure of the cartridge to become complicated and tends to lower the yield and the production rate of the magnetic disk cartridge during manufacture. Especially, in the structure of the aforementioned U.S. Pat. No. 4,460,903, the erasure-preventing piece must be firmly maintained between the upper and lower halves of the cartridge during assembly. This secure position requires a special and rather expensive tool to hold the erasure-preventing piece in place within the cartridge during assembly.

In addition, since the "erasure-preventing" movable piece must be held securely in either the erasure-preventing position or the erasure-enabling position, a detecting mechanism or the like is required. An example of a detecting mechanism is referred to in the 930 'patent noted above. Since a detecting mechanism makes the movable piece rather bulky, the erasure-preventing piece cannot be conveniently used in a relatively small magnetic disk cartridge.

Thus, it remained a problem in the cassette recording and reproducing art to provide a relatively small disk cartridge structure which effectively incorporated a movable erasure-preventing mechanism.

SUMMARY OF THE INVENTION

Therefore, it is a principal object of the present invention to provide a magnetic disk cartridge with an erasure-preventing device which allows data to be written onto a magnetic disk while the device is in one position and which inhibits data writing onto the disk while in another position and which can be easily attached to the magnetic disk cartridge.

In order to accomplish the aforementioned and other objects, a magnetic disk cartridge, in accordance with the present invention, includes a cartridge casing preferably formed from a mating pair of casing components for housing a magnetic disk within the cartridge. A disk state indicator opening capable of receiving a disk state detector of a recording and reproducing apparatus is defined by one of the casing components and is open to the exterior of the cartridge through the periphery of the casing component. A slider is provided and is movably received within the disk state indicator opening for shifting between various slider positions, each of which is indicative of a specific disk state. The slider positions include at least a first position indicative of a disk state enabling writing of the data on the magnetic disk, and a second position indicative of a disk state inhibiting writing of data on the magnetic disk. A click mechanism is provided for restricting movement of the movable slider at predetermined slider positions. The casing component having the disk state indicator opening is also formed with a slider retainer adjacent the disk state indicator opening. The slider retainer is formed integrally with the casing component and is structurally adapted to retain the movable slider when the slider is assembled to the casing component.

In the preferred construction, the slider comprises a first portion adapted to open and close the disk state indicator opening according to the slider positions including the aforementioned first and second positions, and a second portion cooperating with a corresponding portion of the casing component to form the click mechanism and serving as the slider retainer.

In accordance with another aspect of the invention, a magnetic disk cartridge comprises a cartridge casing including first and second components separately formed and assembled together to form the cartridge casing; a magnetic disk rotatably housed within an internal space defined within the cartridge; a disk state indicator opening formed in the first component of the cartridge casing for receiving, when exposed, a disk state detector of a recording and reproducing apparatus, the disk state indicator opening opening onto the periphery of the first component; a slider movably received within the disk state indicator opening for selectively exposing and covering the disk state indicator opening to allow and deny entry of the disk state detector into the disk state indicator opening; and a slider retaining means, integrally formed with the first component, for retaining the slider within the disk state indicator opening when the slider is being assembled to the first component before the first component is assembled to the second component.

According to still another aspect of the invention, an indicator for representing a selectable state of a magnetic disk cassette comprises a lower cassette half having an opening near one edge and a thin flat part contiguous with the opening; an upper cassette half accommodating rotatably a flexible magnetic disk in conjunction with the lower cassette half; and a sliding piece slidably fitted over the thin part of the lower cassette half, and having a pair of parallel plates connected along one edge by an integral part; a hooking part capable of hooking protuberances projecting from the thin part of the lower cassette half; and an indicating part selectively visible through a window through the upper cassette half.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings

DESCRIPTION OF THE PREFERRED EMBODIMENT

Figure 1:
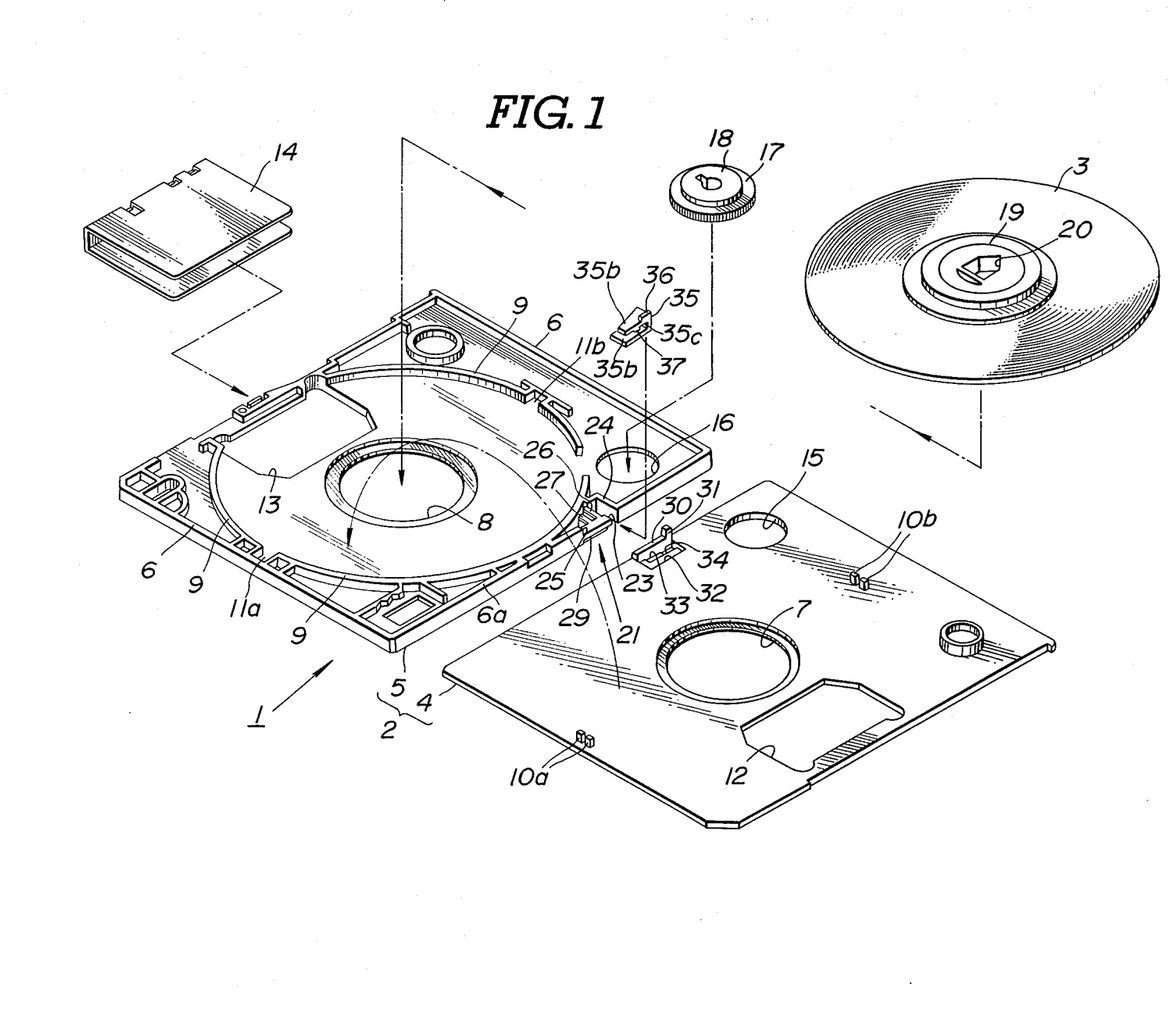
FIG. 1 is an exploded perspective view of a preferred embodiment of a magnetic disk cartridge according to the present invention.
Figure 2:
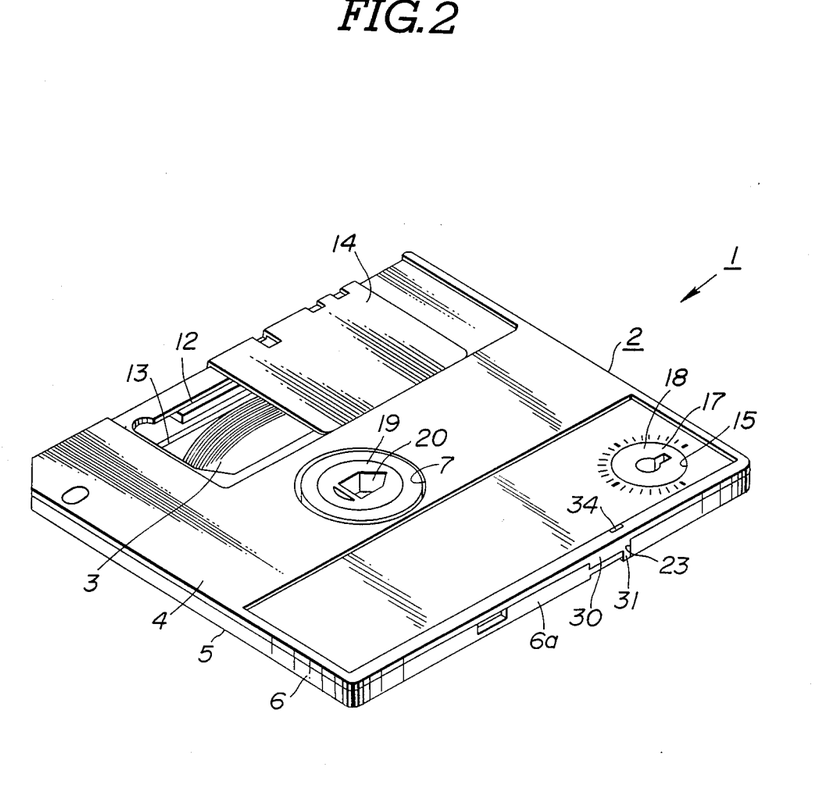
FIG. 2 is a perspective view of the magnetic disk cartridge of FIG. 1, in an assembled form.

Referring now to the drawings, particularly to FIGS. 1 and 2, the preferred embodiment of a magnetic disk cartridge according to the present invention will be described herebelow in terms of a magnetic disk cartridge specifically designed for video recording. Although the specific structure of the magnetic tape cartridge will be described in detail in order to facilitate a better understanding of the invention, it should be noted that the present invention is applicable not only to the shown magnetic disk cartridge structure but also to other types of magnetic disk cartridges.

As shown in FIGS. 1 and 2, the preferred embodiment of the magnetic disk cartridge or cassette 1 generally comprises a cartridge casing 2 preferably made of synthetic resin assembled into the shape of a thin box, as best seen in FIG. 2. The cartridge casing 2 preferably consists of separate upper and lower casings or cassette halves 4 and 5 which are assembled into a shape resembling a thin box by ultra-sonic welding or another appropriate fixing process. The upper and lower casings 4 and 5 when assembled into the cartridge casing 2 define an internal space which structurally accommodates a rotatable magnetic disk 3 serving as a recording medium. When such a cassette casing 2 is inserted into a mating opening of a suitable recording and reproducing apparatus having a data writing head, the cassette is structurally and functionally able to receive signals for recording data on the magnetic disk and for reproducing signals previously recorded on the disk. Such mechanisms for thus cooperating are well known in the art.

The upper casing 4 has a generally planar, rectangular shape. On the other hand, the lower casing 5 further includes a plurality of side walls 6 extending upwardly from the peripheral edges of the major plane section 5a of the upper casing 4. The lower edge of each side wall is preferably integrally formed with the plane section 5a. The upper edge of each side wall 6 is designed to mate with the peripheral edge of the upper casing 4 and is fixed thereto to form the cartridge shown in its assembled form in FIG. 2.

The upper casing 4 and the major plane section 5a of the lower casing 5 each define respective central openings 7 and 8 which are aligned when the upper and lower casings 4 and 5 are assembled together. The central openings 7 and 8 accommodate an essentially cylindrical center core 19 of the magnetic disk 3. The center core 19 of the magnetic disk 3 has a drive hole 20 which engages a drive shaft (not shown) of a disk drive (not shown) of the recording and reproducing apparatus for rotation of the magnetic disk 3 upon command within the cartridge casing 2.

An essentially annular but interrupted projection 9 concentric with the center opening 8 projects upwardly from the major plane section 5a of the lower casing 5. Preferably, the projection 9 is also integrally formed with the major plane section 5a of the disk. The upper edge of the annular projection 9 is designed to contact or to mate with the lower surface of the upper casing 4 to define a generally cylindrical disk receptacle 9a within the cartridge casing 2. The center axis of the center openings 7 and 8 and the center axis of the annular projection 9 are aligned, and offset from the geometrical center of the cartridge casing 2 so that the outer periphery of the annular projection 9 is connected to the inner periphery of one section 6a of the side wall 6.

The lower surface of the upper casing 4 defines at least two pairs of inwardly-extending projections 10a, 10b which are respectively located symmetrically about the center axis of the central opening 7 of the upper cassette half 4. The annular projection 9 defines mating recesses 11a and 11b located oppositely to the projections 10a and 10b. When the two cartridge halves 4 and 5 are assembled, the recesses 11a and 11b securely receive the projections 10a and 10b, respectively, to position properly the upper casing 4 with respect to the lower casing 5.

Windows 12 and 13 are formed in the upper and lower casings 4 and 5 at mutually axially-aligned, opposing positions. As will be appreciated from FIG. 1, the windows 12 and 13 are located near the side of the cartridge 2 which is diametrically opposite the section 6a of the side wall 6. The windows 12 and 13 expose a part of the surface of the magnetic disk 3 to the outside of the cartridge 2. A magnetic head (not shown) contained within into the disk drive can thus enter the cartridge casing 2 to write video data for recording on the magnetic disk 3 and to read the recorded video data from the disk 3 for reproduction. The windows 12 and 13 are opened and closed selectively by a shutter 14 which includes a spaced pair of window-closing plates structurally arranged to be laterally slidable to and fro on the surfaces of the cartridge to cover and uncover the windows respectively. The shutter 14, when in a closed position, covers the windows 12 and 13 while the cartridge is not in use. The shutter 14 is automatically moved to its open position at which it uncovers the windows 12, 13, upon insertion into a recording apparatus, such as an electronic camera and the like, and/or into a disk player serving as a reproducing apparatus. While the shutter 14 is in its open position and the windows 12 and 13 are uncovered, the magnetic head of the disk drive can enter into the cartridge casing and contact the magnetic disk 3 for recording and reproduction. The mechanism for actuating the shutter 14 between its closed position and open position is a well-known technique disclosed in this art.

The magnetic disk cartridge may be provided with an indicator member 17 for indicating the number of annular tracks in which data have been recorded. This indicator member has been disclosed in detail in U.S. Pat. No. 4,511,944, issued on Apr. 16, 1985, to Saito, and assigned to the assignee of the present invention. Also, a similar indicator means has been disclosed in U.S. Pat. No. 4,466,302, mentioned above. The disclosures concerning the indicator means in the aforementioned United States patents are hereby incorporated by reference for the sake of completeness of this disclosure.

The magnetic disk cartridge 1 is also provided with a status indicator mechanism which is generally represented by the reference numeral 21. In summary, the status indicator mechanism 21 indicates whether or not the magnetic disk cartridge is able to receive additional data for storage on the disk 3. A potential difficulty is that whenever data are written onto the disks, the newly-written data over-writes the previously recorded data and thus erases whatever data, if any, had been previously recorded. Therefore, when the recorded data are not to be erased even in error, the magnetic disk cartridge 1 must be placed in a condition wherein the writing of new data is inhibited. The state of the magnetic disk cartridge in which data recording is prevented will be hereafter referred to as a "write-inhibited state". On the other hand, the state of the magnetic disk cartridge wherein writing of data is allowed will be referred to hereafter as a "write-enabled state". Therefore, the status indicator mechanism 21 is actuable between the write-inhibited state and write-enabled state.

The status indicator mechanism includes a laterally-slidable slider member 35. The slider member 35 acts to change the status of the status indicator mechanism 21 by moving between at least two defined positions. The slider member 35 is free to move between a write-inhibited position, which position will be hereafter referred to as an "inhibiting position" and a write-enabled position, which position will be hereafter referred to as an "enabling position".

The lower casing 5 further defines a rectangular opening 22 (best seen in FIGS. 3–5) which is integrally formed with an opening 23 extending through the portion 6a of the side wall 6 which defines an interruption in the continuity of the side wall 6a. The opening 22 is transversely offset from the center axis of the cartridge which extends through the center axis of the openings 7 and 8 of the upper and lower casings 4 and 5. The major portion of the opening 22 is located between the outer periphery of the annular projection 9 and the inner periphery of the side wall portion 6a of the cassette half 5. The opening 23 receives the slider 35 upon assembly and allows the slider to enter the opening 22 as shown in either FIGS. 1 or 3. The slider 35 is thus added to the lower casing 5 from outside the cartridge after the cartridge is assembled.

Figure 3:
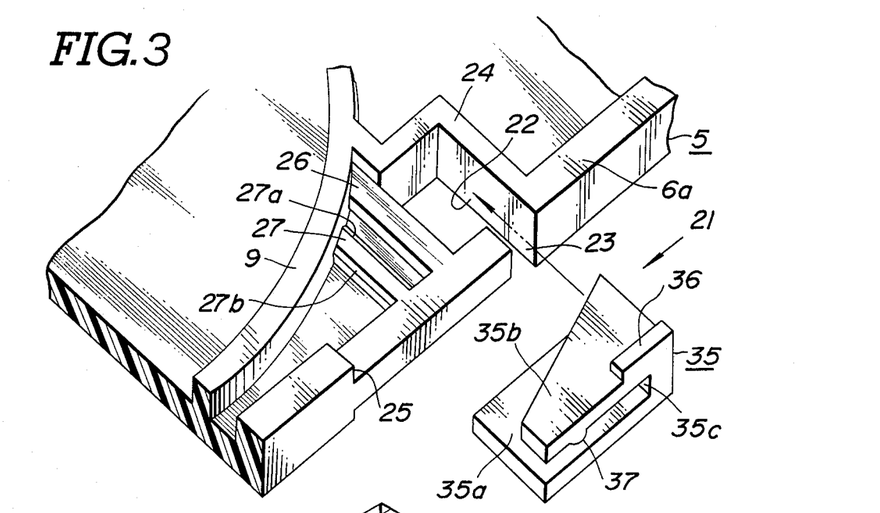
FIG. 3 is an enlarged perspective view of a major portion of the magnetic tape cartridge, which shows the preferred embodiment of an erasure-inhibiting mechanism in the magnetic disk cartridge according to the invention.

The slider 35 is made from a suitable synthetic resin and is generally channel-shaped with an upper horizontal leg portion 35b, a lower horizontal leg portion 35a and an intermediate vertical connecting portion 35c extending between the upper and lower horizontal leg portions 35b and 35a at one end thereof, to define a generally U-shaped section. At least the upper horizontal leg portion 35b of the slider 35 is elastically deformable. As shown in FIGS. 1 and 3, the upper horizontal leg portion 35b has a projection 37 extending downwardly from the lower surface at a location remote from the connection portion 35c. The upper horizontal portion 35b also includes an extension 36 extending upwardly from its outer peripheral edge in the region adjacent the connecting portion 35c. The inner peripheral edge of the upper horizontal leg portion 35b is tapered toward its free end.

The lateral thickness of the vertical connecting portion 35c matches or is slightly less than the lateral width of the opening 23 so that the slider 35 is able to pass through the opening 23 when the slider 35 is assembled to the lower casing 5.

A vertically-extending rib 24 extends along the peripheral edge of the opening 22. The rib 24 is generally L-shaped and is connected to the annular projection 9 at its one end and to the section 6a of the side wall 6 at its other end.

The section 6a of the side wall 6 has a lower portion 25 which defines a cut-out 25a in its upper edge. A click plate 26 is integrally formed with the section 25 and extends frontwardly. The lower cassette half 5 also defines a linearly-shaped click rib 27 extending between the side wall 6a and the projection 9 and having bevelled edges 27a and 27b. The click rib 27 is also integral to the portion 25 and lies parallel to the click plate 26. The front end of each of the click plate 26 and the click rib 27 adjoin the outer periphery of the annular projection 9. In the preferred construction, the inclination of the bevelled edges 27a and 27b is selected to be 45°. The click rib 27 as structured engages the downward projection 37 of the slider 35 in order to serve as a click stop for the slider 35.

The upper edges of the rib 27 and the click plate 26 lie flush with the upper horizontal plane of the cut-out 25. Therefore, this structure leaves space for the upper horizontal section 35b of the slider 35.

Figure 4:
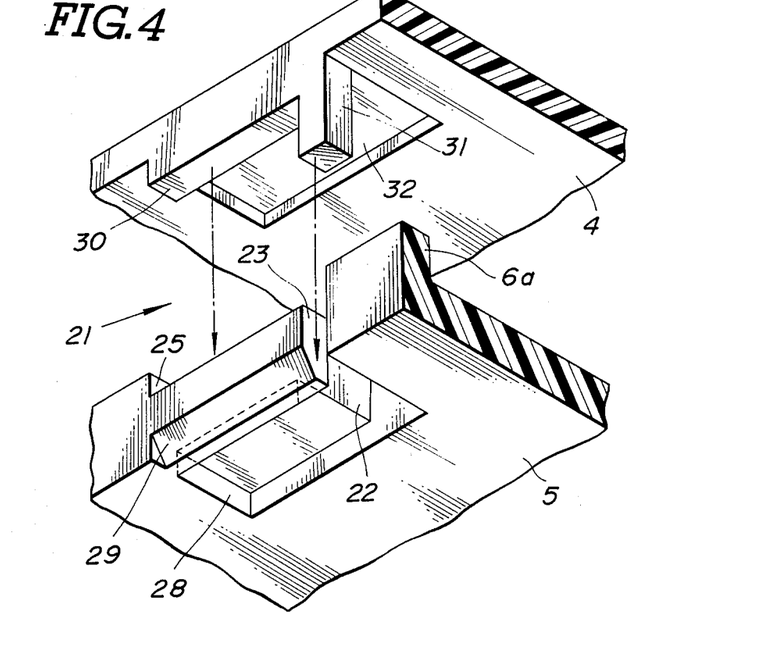
FIG. 4 is an exploded and enlarged perspective of the erasure-inhibiting mechanism of FIG. 3.

As shown in FIGS. 1 and 4, the upper casing 4 has a strip 30 projecting slightly downwardly from the edge of the upper casing 4, as well as a projection 31 which is deeper but narrower than the strip 30. The strip 30 and the projection 31 generally oppose the opening 22 and the cut-out 25 respectively. The dimensions of these parts 30, 31 match those of the spaces 23 and 25 so as to mate with the latter when the upper and lower casings are assembled and to fill these spaces. In practice, the outer periphery of the elements 30 and 31 lie flush with the outer periphery of the side-wall 6.

Figure 5:
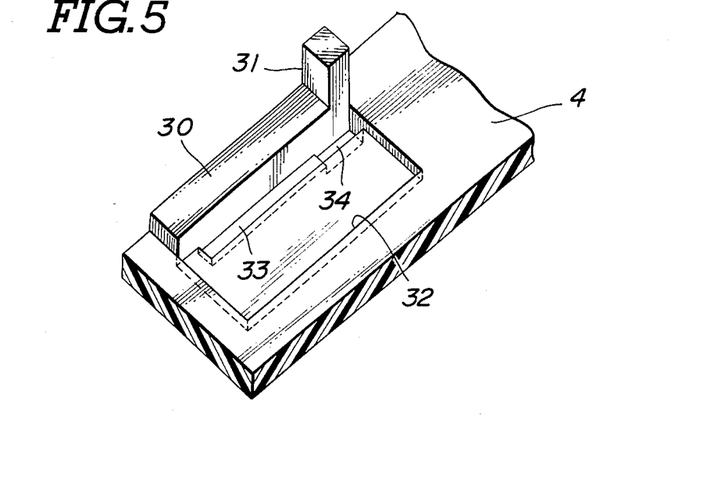
FIG. 5 is an enlarged partial section in perspective of the erasure-inhibiting mechanism of FIG. 3.

As best shown in FIG. 5, the upper casing 4 also defines a rectangular recess 32 which overlies the click plate structure. A window 34 opening to the upper surface of the upper casing 4 extends through the upper casing 4. The upper edge of the vertical extension 36 of the slider 35 thus opposes the window 34 so as to be visible from outside the cartridge 1. The window 34 is contiguous with a groove 33 extending along the strip 30, as shown in FIG. 5. The recess 32 in conjunction with the periphery 24 of the rectangular opening 22 and the click plate 26 thus defines a space for receiving the upper horizontal portion 35b of the slider and allows resilient deformation of the section 35b as the slider moves laterally with respect to the wall 6a.

As will be clear from FIG. 4, an essentially rectangular recess 28 is defined on the lower surface of the assembled magnetic tape cartridge 1. The recess 28 is contiguous with the opening 22. The forward/rearward dimension of the recess 28 matches that of the opening 22. The lower portion 35a of the slider 35 rests within the recess 28 and is therefore exposed from the lower surface of the magnetic disk cartridge 1. The lower edge 29 of the section 25 is bevelled along the edge facing away from the recess 28. The bevelled edge 29 serves as a guide when the magnetic disk cartridge is being assembled.

In the preferred construction, the whole body of the slider 35 or at least the vertical projection 36 of the slider 35 is dyed a different color than the cartridge casing 2 to provide good visual contrast. This color indicia makes it easier to recognize the recording status of magnetic disk cartridge at a glance.

To assemble the slider 35 onto the lower casing 5, the slider 35 is slid into engagement with the lower casing 4 in the direction shown by the arrow in FIG. 3. At this time, the lower surface of the upper horizontal leg portion 35b passes over the cut-out 25 and the vertical connecting portion 35c passes through the opening 23. The lower horizontal leg portion 35a comes into contact with the bevelled edge 29. As the slider 35 is driven forcibly onto the lower casing 5, the lower horizontal leg portion 35a is elastically or resiliently deformed as the slider 35 slides over the bevelled edge 29. Therefore, when the lower horizontal leg portion 35a is sufficiently deformed to pass over the bevel 29, the slider 35 can be slid into engagement with the lower casing 5. At this time, the upper horizontal leg portion 35b of the slider 35 is positioned in the space 26c and the lower horizontal section 35a is received within the recess 28. Then, the upper casing 4 is fitted onto the lower casing 5.

In this state, the upper casing 4 is fastened to the lower casing 5 in a way which precludes significant vertical, longitudinal, or transverse displacement. During assembly, a vertical displacement of the slider 35 is restricted by engagement between the upper and lower horizontal leg portions 35b and 35a and the click plate 26. A longitudinal displacement of the slider 35 away from the lower casing 5 is prevented by the edge 29 of the section 6a of the side wall 6, which extends downwardly to form the outer periphery of the recess 28. Finally, the transverse movement of the slider 35 is restricted by a detent engagement between the downward projection 37 of the upper horizontal leg portion 35b and the click plate 26 and the click rib 27. Therefore, the slider 35 is sufficiently securely retained in place.

Figure 6:
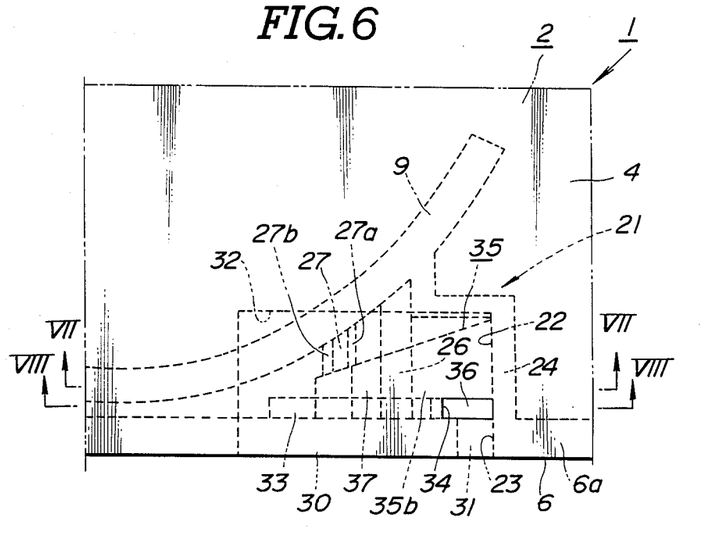
FIG. 6 is a partial and enlarged plan view of the magnetic disk cartridge with the erasure-inhibiting mechanism of FIGS. 3 to 5.
Figure 7:
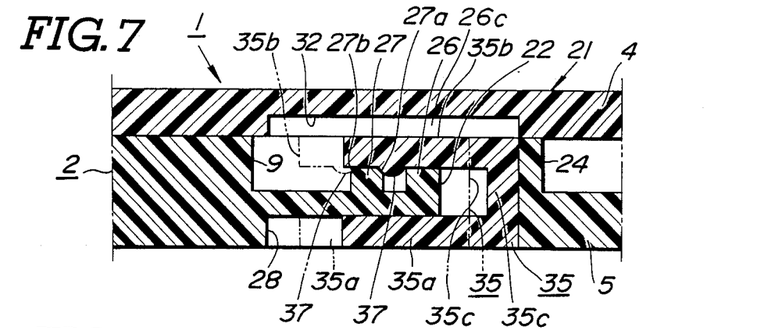
FIG. 7 is a section taken along line VII—VII of FIG. 6.

After assembly, the slider 35 is placed at the position as shown in FIGS. 6 and 7. In this position, the downward projection 37 of the upper horizontal leg section 35b engages the first bevelled edge 27a of the click rib 27. Therefore, the slider 5 is resiliently retained in this initial position. As will be appreciated, at the position of the slider 35 shown in FIGS. 6 and 7, one face of the vertical connection portion 35c of the slider 35 abuts the rib 24. In this condition, the opening 22 is closed by the slider 35. Therefore, a disk condition detector member of the recording and reproducing device cannot enter the opening 22. In this circumstance, data can be written onto the magnetic disk 3 as the writing head (not shown) of the recording and reproducing device can enter the magnetic disk cartridge 1 to gain access to the recording surface of the magnetic disk 3.

Furthermore, when the slider 35 is in this position, the window 34 in the upper casing 4 fully overlaps the upper edge of the upward projection 36. Therefore, as seen from outside, the window 34 is filled by the contrasting upper edge of the upward projection 36 of the slider 35. As set forth, the slider 35 is retained at this position by a detent engagement of the downward projection 37 on the horizontal leg portion 35b of the slider 35. This position of the slider 35 corresponds to the enable position mentioned above.

Figure 8:
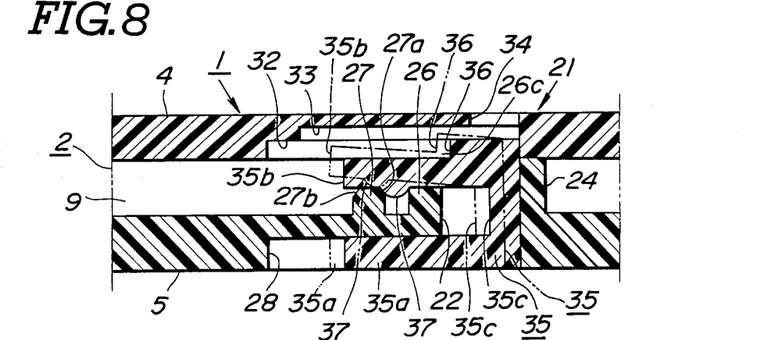
FIG. 8 is a section taken along line VIII—VIII of FIG. 6.
Figure 9:
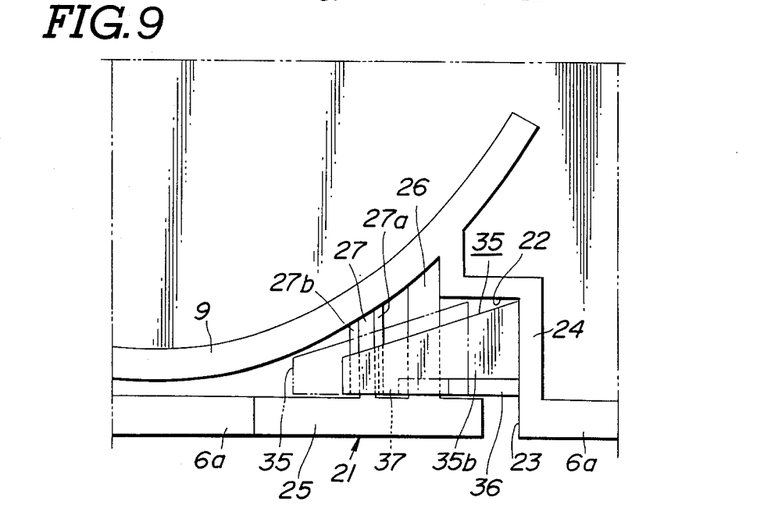
FIG. 9 is a partial plan view of a magnetic disk cartridge from which the upper half is removed to show the operation of the erasure-inhibiting mechanism.

When applying force to shift the slider out of the write-enabled position shown in solid lines in FIGS. 7 and 8 to the write-inhibited position shown in phantom line in FIGS. 7 and 9, the upper horizontal section 35b o of the slider 35 is resiliently deformed, as shown in FIG. 8. Specifically, in order to shift from the write-enabled position to the write-inhibited position, the slider 35 is shifted to the left as seen in FIGS. 7 and 9. A manually-applied leftward force on the slider 35 causes the left side of the downward projection 37 to come into contact with the inclined bevel 27a of the click rib 27. Since the bevel 27a is inclined, the upper horizontal section 35b is deformed upwardly as shown in phantom line in FIG. 8. As shown, the recess 32 accommodates the upward lift on the horizontal leg portion 35b as the downward projection 37 rides upwardly on the bevel 27a and thus raises the resilient leg portion 35b, while the slider 35 is moved leftwardly.

The recess 32 formed in the upper casing 4 and the space thus defined over the click plate 26 allow upward deformation of the upper horizontal section 35b. As part of the upward deformation of the upper horizontal section 35b, the upward projection 36 also shifts upwardly. Thus, the upward projection 36 is free to enter the groove 33 and thus does not abut against the upper casing 4. Therefore, the slider 35 is free to move to the left due to the clearances around the upper horizontal section and the upward projection.

Following further leftward movement, the slider 35 reaches the position illustrated in phantom lines in FIGS. 7 and 9 which position corresponds to the "write-inhibited" position of the slider 35. In this position, the vertical section 35c of the slider 35 is separated from the rib 24 and thus exposes the openings 23 and 22. Therefore, the disk condition detector of the recording and reproducing apparatus can enter the uncovered opening 22. Thus, writing of data onto the magnetic disk 3 is inhibited. At the same time, the upward projection 36 of the slider 35 is shifted away from the window 34 of the upper casing 4. As a result, the upward projection 36 disappears from view. On the other hand, the lower horizontal section 35a can be seen from below to be shifted to the inhibiting position.

It should be appreciated that although the slider position fully closing the opening 22 is referred to as the write-enabled position and the slider position fully exposing the opening 22 is referred to as the inhibit position, the slider 35 can be arranged to be used in the opposite way. For instance, in certain recording and reproducing devices, the fully-closed position of the slider 35 can be the inhibit position and the fully-exposed position of the slider can be the enable position.

While the present invention has been disclosed in terms of the preferred embodiment of the invention in order to facilitate a full understanding of the invention, it should be appreciated that the present invention should not be limited to the specific embodiment illustrated above. Various embodiments and modifications of the shown embodiment are possible. Therefore, the present invention should be understood as including all possible embodiments and modifications which do not depart from the principles of the invention set our in the appended claims.

What is claimed is:

1. In a magnetic disk cartridge of the type which comprises a cassette having a cover and a recording medium mounted therein, said cassette being structurally adapted to cooperate with a data recording and reproducing apparatus for recording data upon said recording medium and reproducing data recorded upon said recording medium, said cassette and said apparatus further cooperating to permit data to be recorded on said recording medium when said cassette is in a write-inhibited state, the improvement comprising:
    a disk state indicator means including a recording state indicator opening formed in said cassette cover for receiving at least a portion of a means for detecting the recordable state of said recording medium, said recording state indicator opening being connected to a cut-out formed in said cassette cover;
    sliding means being installed on said cassette cover through said cut-out and cooperating with said disk state indicator means, for selectively covering and uncovering said recording state indicator opening to permit and inhibit respectively said opening from receiving said portion of said detecting means in said opening;
    means, cooperative with said cassette cover for permitting said sliding means to pass said cut-out upon assembling, and for blocking said cut-out after installation of said sliding means in said cassette cover, said means for permitting said sliding means to pass and for blocking including a surface component lying flush with the outer periphery of said cassette cover while said cut-out is blocked; and
    means provided as a portion of said cassette cover for retaining said sliding means in a sliding relationship within said opening.

2. The improvement as set forth in claim 1, wherein said cassette cover comprises a first component and a second component secured together to constitute said cover, one of said components integrally defining said retaining means so that said sliding means is retained on said one component prior to securing said one component to said second component.

3. A magnetic disk cartridge comprising: a cartridge casing including first and second components separately formed and assembled together to form said cartridge casing;
    a magnetic disk rotatably housed within an internal space defined within said cartridge casing;
    a disk state indicator opening formed in said first component of said cartridge casing for receiving disk state detector of a recording and reproducing apparatus when exposed, said disk state indicator opening onto the periphery of said first component;
    a slider movably received within said disk state indicator opening for selectively exposing and covering said disk state indicator opening so as to allow and deny entry of said disk state detector into said disk state indicator opening; and
    a slider retaining means disposed between said first and second components and integrally formed with said first component, for retaining said slider within said disk state indicator opening at least when said slider is being assembled to said first component before said first component is assembled to said second component, said slider retaining means having a slider-retaining surface lying flush with the outer periphery of said cartridge casing as assembled.

4. The magnetic disk cartridge as set forth in claim 3, wherein said slider retaining means comprises a first member incorporated in said slider and a second member incorporated in said first component, said first and second members structurally cooperating to retain said slider in said disk state indicator opening.

5. The magnetic disk cartridge as set forth in claim 3, which further comprises a click mechanism associated with said slider for retaining movement of said slider to among a plurality of predetermined slider positions, which slider positions include a first position at which slider fully covers said disk state indicator opening and a second position at which said slider fully exposes said disk state indicator opening.

6. The magnetic disk cartridge as set forth in claim 3, wherein said click mechanism comprises a first member incorporated with said slider and a second member incorporated in said first component of said cartridge casing and engageable to said first member for establishing a click engagement therewith.

7. The magnetic disk cartridge as set forth in claim 4, wherein said slider comprises first and second horizontal leg portions extending substantially in parallel relationship to each other and a third vertical portion extending between said first and second leg portions, said first and second horizontal leg portions of said slider forming said first member of said slider retaining means, said second member of said slider retaining means comprising a thinner section integrally formed with said first component, which thinner section is adapted to be resiliently pinched by said first and second horizontal leg portions of said slider.

8. The magnetic disk cartridge as set forth in claim 7, wherein said slider retaining means further comprises a vertical extension vertically extending from the peripheral edge of said first component and structurally adapted to restrict movement of said slider along said thinner section.

9. The magnetic disk cartridge as set forth in claim 7, which further comprises a click mechanism associated with said slider for restricting movement of said slider to among a plurality of predetermined slider positions, which slider positions include a first position at which said slider fully covers said disk state indicator opening and a second position at which said disk state indicator opening is fully exposed, said click mechanism forming a part of said slider retaining means for restricting movement of said slider.

10. The magnetic disk cartridge as set forth in claim 7, which further comprises a closure strip formed with said second component, which closure strip is structurally adapted to form part of an outer periphery of the assembled cartridge casing and to close the opening end of said indicator opening opening to the periphery of said first component.

11. The magnetic disk cartridge as set forth in claim 7, wherein said second component is formed with a detent located opposite said first horizontal leg portion of said slider for allowing resilient vertical displacement of said first horizontal component when said slider is shifted between said first and second positions.

12. The magnetic disk cartridge as set forth in claim 11, wherein said second component has a major plane formed with a through opening through which a disk state indicator strip is exposed while said slider is placed at said first position.

13. An indicator for representing a selectable recording state of a magnetic disk cassette comprising:
a lower cassette half having an opening near one edge and a thin flat part contiguous with said opening, said thin flat part including projecting protuberances;
an upper cassette half accommodating rotatably a flexible magnetic disk in conjunction with said lower cassette half and defining a window therethrough; and
a sliding piece slidably fitted over said thin part of said lower cassette half, and having a pair of parallel plates connected along one edge by an integral part, a hooking part structurally adapted for hooking said protuberances projecting from said thin part of said lower cassette half and an indicating part selectively visible through said window through said upper cassette half;
a slider retaining means, disposed between said first and second cassette halves for retaining said sliding piece within said state indicator opening when said slider is being assembled to said first cassette half before said first cassette half is assembled to said second cassette half, said slider retaining means having a slider-retaining surface lying flush with the outer periphery of said cartridge casing as assembled.

14. The indicator for representing a selectable state of a magnetic disk cassette as set forth in claim 13, wherein said lower cassette half includes a cut-out between said opening and an edge of said cassette, and wherein said integral part of said sliding piece fits through said cut-out.

15. The indicator for representing a selectable state of a magnetic disk cassette as set forth in claim 14, wherein said upper cassette half has a projection which fits into said cut-out.

16. The indicator for representing a selectable state of a magnetic disk cassette as set forth in claim 15, wherein an undersurface of said thin part is surrounded on three sides by a thicker part of said lower cassette half, whereby said sliding piece is slidably guided in the direction perpendicular to said integral part of the piece by the surrounding thicker part of said lower cassette half.

17. The indicator for representing a selectable state of a magnetic disk cassette as set forth in claim 16, wherein a part of said lower cassette half between said thin part and the near edge has a slanting surface contiguous with said cut-out of said lower cassette half for guiding said sliding piece during assembly.

18. In a magnetic disk cartridge of the type which comprises a cassette having a cover and a recording medium mounted therein, said cassette being structurally adapted to cooperate with a data recording and reproducing apparatus for recording data upon said recording medium, said cassette and said apparatus further cooperating to permit data to be recorded on said recording medium when said cassette is in a write-enabled state and to inhibit data from being recorded on said recording medium when said cassette is in a write-inhibited state, the improvement comprising means for indicating a recording status of said cassette, said status indicating means being actuatable at least between said write-inhibited state and said write-enabled state, said status indicating means comprising:
a slider member, structurally adapted to slide in a structurally related opening in said cassette between said write-enabled and said write-inhibited states, said slider member including
an upper horizontal leg having a thickness which is structurally related to an upper recess in a wall of said cassette cover, said recess having a length which permits said upper horizontal leg to laterally slide in said upper recess between said states, said upper horizontal leg further defining at an upper surface thereof a projection which visually displays the position of the slider member and thus indicates the recording state of the cassette, said upper horizontal leg further defining a downwardly-extending projection which structurally mates with a transversely-extending recess in said cassette adjacent a click rib so that lateral movement of said slider member betweens status is resiliently restrained in one of said states, said horizontal leg portion further being resiliently deformable and shape-retentive to facilitate assembly;
a lower horizontal leg portion substantially parallel to said upper horizontal leg portion and having a thickness not greater than a thickness of a lower laterally-extending recess in said wall of said cassette opposite said upper laterally-extending recess, said upper and lower laterally-extending recesses being separated by a wall portion of said cassette cover defining a thickness not greater than the distance between said upper and lower horizontal leg portions, said thickness being thinner than the thickness of the normal wall portion of said cassette; and
a connecting portion connecting said upper and lower horizontal-extending portion at about one end thereof, the width of said extending portion being structurally adapted to pass through a transverse opening in said cassette during assembly.

19. The status-indicating means of claim 18 in combination with a cassette, said cassette defining a slider member receiving opening adjacent said transverse opening for receiving said slider member therein, said member receiving opening having a lateral extent sufficient to permit said slider member to move between said states.

20. The status-indicating means of claim 18 in combination with a cassette, said cassette defining a transversely-extending recess for receiving said downwardly-extending projection therein.

21. The status-indicating means of claim 19 in combination with a cassette, said cassette defining a transversely-extending click rib.

22. The status-indicating means of claim 19 in combination with a cassette, wherein said click rib includes beveled edges to facilitate passage of said downwardly extending projection.

23. In a magnetic disk cartridge of the type which comprises a cassette having a cover and a recording medium mounted therein, said cassette being structurally adapted to cooperate with the data recording and reproducing apparatus for recording data upon said recording medium, said cassette and said apparatus further cooperating to permit data to be recorded on said recording medium when said cassette is in a write-enabled state and to inhibit data from being recorded on said recording medium when said cassette is in a write-inhibited state, the improvement comprising means on said cassette for receiving a sliding member therein for indicating a recorded state of said cassette, said slider member receiving means including:
- a wall of said cassette having a normal thickness and defining an upper recess and a lower recess separated by a portion of said wall thinner than the thickness of said wall, said thinner portion being adjacent a transverse opening in said cassette which permits the slider member having a connecting portion connecting an upper horizontal leg and a lower horizontal leg to pass transversely therethrough;
- said cassette further defining a slider member receiving opening therein which permits said slider member to be manually laterally actuatable between a first position and a second position;
- a transversely-extending click rib adjacent said slider member receiving opening;
- a transversely-extending recess interior to said thinner wall portion receiving a downward projection on the upper horizontal leg of said slider member to secure said slider member in one of said states; and
- a transversely-extending click rib structurally adapted to permit said downwardly extending member to move laterally relative to said click rib when said slider member is moved from one state to another.

24. The cassette as set forth in claim 23, wherein said cassette comprises a lower casing and an upper casing, one of which defines said slider receiving opening and said opening in the side wall thereof.

25. The cassette as set forth in claim 24, wherein said slider receiving opening is located transversely offset from the center axis of said cassette between said side wall and an outer periphery of an annular projection in said cassette for defining a space for receiving said recording medium, said slider receiving opening and aid opening in the side wall being structurally adapted for receiving said slider member from outside the cartridge after the cartridge is assembled.

26. The cassette as set forth in claim 25, further defining a vertically-extending rib extending along the peripheral edge of said slider receiving opening, said rib being generally L-shaped and connected to said annular projection at one end thereof and to the side wall at the other.

27. The cassette as set forth in claim 26, wherein said click plate and said click rib extend between said annular projection and the thin portion of said side wall, the upper edges of said click plate and said click rib lying flush with the upper horizontal plane of the recess defining a cutout in the side wall of said cassette.

28. The cassette as set forth in claim 27, wherein said upper casing includes a strip projecting slightly downwardly from an edge at the upper casing and a projection, said strip filling said upper horizontal recess and said projection filling said opening in the lower casing when said upper and lower casings are connected after said slider member is retained in said opening.

29. The cassette as set forth in claim 28, wherein the upper casing further defines a rectangular recess which overlies the click plate structure so that an upperwardly extending status indicating projection on said slider member is visible from outside of the cartridge.

30. A cartridge for storing a magnetic recording medium within an internal space thereof, said cartridge being operable between a write-enable state and read-only state in which writing-in of information is inhibited, said cartridge comprising:
- a cartridge casing compound of a first half and second half respectively structurally designed for forming a hollow, thin, box-shape casing defining said internal space for receiving said recording medium;
- first structural means, associated with said first half, for defining a state indicator opening which indicates a write-enabling state of said cartridge in its first state and read-only state in its second state;
- second structural means, cooperative with said first structural means, for switching said state of said state indicator opening between said first state and state and said second state, said second structural means including a mechanically movable component movable between a first position for placing said indicator opening at said first state and a second position for placing said indicator opening at said second state;
- third structural means, disposed between said first and second halves of said cartridge casing, for defining a path for said second structural means to be installed within said casing for movement between said first and second positions, said third structural means including an element for blocking said path for preventing said second structural means from moving out of said cartridge after installation; and
- fourth structural means disposed between said first and second halves and cooperating with said first and second halves of said cartridge casing, for retaining and guiding said mechanically movably component of said second structural means so that said mechanically movable component can thrustingly move between said first and second position, said fourth structural means including a mechanical stopper mechanism cooperative with said mechanically movable component for releaseably stopping the latter at said first and second positions said movable component including a portion which is disposed within said indication opening, said portion having a surface exposed through said indication opening and lying flush with respect to an external plane of said casing.

31. A magnetic disk cartridge comprising:

a cartridge casing including first and second components separately formed and assembled together to form said cartridge casing;

a magnetic disk rotatably housed within an internal space defined within said cartridge;

a disk state indicator opening formed in said first component of said cartridge casing for receiving a disk state detector of a recording and reproducing apparatus when exposed, said disk state indicator opening opening onto the periphery of said first component;

a slider movably received within said disk state indicator opening for selectably exposing and covering said disk state indicator opening so as to allow and deny entry of said disk state detector into said disk state indicator opening; and a slider retaining means, integrally formed with said first component, for retaining said slider within said disk state indicator opening when said slider is being assembled to said first component before said first component is assembled to said second component, said slider retaining means comprising a first member incorporated in said slider and a second member incorporated in said first component, said first and second members structurally cooperating to retain said slider in said disk state indicator opening, said slider comprising first and second horizontal leg portions extending substantially in a parallel relationship to each other and a third vertical portion extending between said first and second leg portions, said first and second horizontal leg portions of said slider forming said first member of said slider retaining means comprising a thinner section integrally formed with said first component, which thinner section is adapted to be resiliently pinched by said first and second horizontal leg portions of said slider; and a closure strip formed with said second component, which closure strip is structurally adapted to form part of an outer periphery of the assembled cartridge casing and to close the opening end of said indicator opening opening to the periphery of said first component.

32. The magnetic disk cartridge as set forth in claim 31, which further comprises a click mechanism associated with said slider for restricting movement of said slider to among a plurality of predetermined slider positions, which slider positions include a first position at which said slider fully covers said disk state indicator opening and a second position at which said slider fully exposes said disk state indicator opening.

33. The magnetic disk cartridge as set forth in claim 32, wherein said click mechanism comprises a first member incorporated with said slider and a second member incorporated in said first component of said cartridge casing and engageable to said first member for establishing a click engagement therewith.

34. The magnetic disk cartridge as set forth in claim 31, wherein said slider retaining means further comprises a vertical extension vertically extending from the peripheral edge of said first component and structurally adapted to restrict movement of said slider along said thinner section.

35. The magnetic disk cartridge as set forth in claim 31, which further comprises a click mechanism associated with said slider for restricting movement of said slider to among a plurality of predetermined slider positions, which slider positions include a first position at which said slider fully covers said disk state indicator opening and a second position at which said disk state indicator opening is fully exposed, said click mechanism forming a part of said slider retaining means for restricting movement of said slider.

36. The magnetic disk cartridge as set forth in claim 21, wherein said second component is formed with a detent located opposite said first horizontal leg portion of said slider for allowing resilient vertical displacement of said first horizontal component when said slider is shifted between said first and second positions.

37. The magnetic disk cartridge as set forth in claim 36, wherein said second component has a major plane formed with a through opening through which a disk state indicator strip is exposed while said slider is placed at said first position.

38. An indicator for representing a selectable recording state of a magnetic disk cassette comprising:

a lower cassette half having an opening near one edge and a thin flat part contiguous with said opening and a cut-out between said opening and an edge of said cassette;

an upper cassette half accommodating rotatably a flexible magnetic disk in conjunction with said lower cassette half; and a sliding piece slidably fitted over said thin part of said lower cassette half, having a pair of parallel plates connected along one edge by an integral part, a hooking part capable of hooking protuberances projecting from said thin part of said lower cassette half and an indicating part selectively visible through a window through said upper cassette half, wherein said integral part of said sliding piece fits through said cut-out.

39. The indicator for representing a selectable state of a magnetic disk cassette as set forth in claim 38, wherein said upper cassette half has a projection which fits into said cut-out.

40. The indicator for representing a selectable state of a magnetic disk cassette as set forth in claim 39, wherein an undersurface of said thin part is surrounded on three sides by a thicker part of said lower cassette half, whereby said sliding piece is slidably guided in the direction perpendicular to said integral part of the piece by the surrounding thicker part of said lower cassette half.

41. The indicator for representing a selectable state of a magnetic disk cassette as set forth in claim 39, wherein a part of said lower cassette half between said thin part and the near edge has a slanting surface contiguous with said cut-out of said lower cassette half for guiding said sliding piece during assembly.

42. A magnetic disk cartridge comprising:

a cartridge casing including first and second components separately formed and assembled together to form said cartridge casing;

a magnetic disk rotatably housed within an internal spaces defined within said cartridge casing;

disk state indicator opening formed in said first component of said cartridge casing for receiving a disk state detector of a recording and reproducing apparatus when exposed, said disk state indicator opening onto the periphery of said first component;

a slider movably received within said disk state indicator opening for selectively exposing and covering said disk state indicator opening so as to allow and deny entry of said disk state detector into said disk state indicator opening, said slider comprising first and second members extending essentially in a parallel relationship to each other in a spaced apart relationship with a predetermined width of gap therebetween; and a slider retaining means, disposed between said first and second members for retaining said slider within said disk state indicator opening when said slider is being assembled to said first component before said first component is assembled to said second component, said slider retaining means having a slider-retaining surface lying flush with the outer periphery of said cartridge casing as assembled.

43. A magnetic disk cartridge comprising:

a cartridge casing including first and second components separately formed and assembled together to form said cartridge casing, one of said first and second components being formed with a cut-out;

a magnetic disk rotatably housed within an internal spaced defined within said cartridge casing;

a disk state indicator opening formed in said first component of said cartridge casing for receiving a disk state detector, of a recording and reproducing apparatus when exposed, said disk state indicator opening onto the periphery of said first component;

a slider disposed within said disk state indicator opening through said cut-out, movably received within said disk state indicator opening for selectively exposing and covering said disk state indicator opening so as to allow and deny entry of said disk state indicator into said disk state indicator opening; and a slider retaining means for retaining said slider within said disk state indicator opening, said slider retaining means comprising a first retaining means integrally formed with said first component for retaining said slider within said disk state indicator opening when said slider is being assembled to said first component before said first component is assembled to said second component, and a second retaining means for closing said cut-out, said second slider retaining means having a slider retaining surface lying flush with the outer periphery of said cartridge casing as assembled.

44. An indicator for a data storage cartridge storing a recording medium, which indicates recording permitting state and recording inhibiting state of said cartridge, comprising:

a cartridge casing including first and second components separately formed and assembled together to form said cartridge casing;

a state indicator opening formed in said first component of said cartridge casing for receiving a state detector of a recording and reproducing apparatus when exposed, said state indicator opening onto the periphery of said first component;

a slider movably received within said state indicator opening for selectively exposing and covering said state indicator opening so as to allow and deny entry of said state indicator into said state indicator opening, said slider comprising first and second members extending essentially in a parallel relationship to each other in a spaced apart relationship with a predetermined width of gap therebetween; and a slider retaining means, disposed between said first and second members for retaining said slider within said state indicator opening when said slider is being assembled to said first component before said first component is assembled to said second component, said slider retaining means having a slider retaining surface lying flush with the outer periphery of said cartridge casing as assembled.

45. An indicator for a data storage cartridge storing a recording medium, which indicates recording permitting state and recording inhibiting state of said cartridge, comprising:

a cartridge casing including first and second components separately formed and assembled together to form said cartridge casing, one of said first and second components being formed with a cut-out;

a state indicator opening formed in said first component of said cartridge casing for receiving a state detector of a recording and reproducing apparatus when exposed, said state indicator opening onto the periphery of said first component;

a slider disposed within said state indicator opening through said cut-out, movably received within said state indicator opening for selectively exposing and covering said state indicator opening so as to allow and deny entry of said state indicator into said disk state indicator opening; and a slider retaining means for retaining said slider within said state indicator opening, said slider retaining means comprising a first retaining means integrally formed with said first component for retaining said slider within said state indicator opening when said slider is being assembled to said first component before said first component is assembled to said second component, and a second retaining means for closing said cut-out, said second slider retaining means having a slider retaining surface lying flush with the outer periphery of said cartridge casing as assembled.

* * * * *